United States Patent
Kang

(10) Patent No.: US 10,340,105 B2
(45) Date of Patent: Jul. 2, 2019

(54) POWER SUPPLY APPARATUS AND METHOD THEREOF

(71) Applicant: Samsung Electronics Co., Ltd., Suwon-si (KR)

(72) Inventor: Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 15/434,415

(22) Filed: Feb. 16, 2017

(65) Prior Publication Data

US 2017/0278658 A1    Sep. 28, 2017

(30) Foreign Application Priority Data

Mar. 22, 2016    (KR) .................. 10-2016-0034138

(51) Int. Cl.
| | |
|---|---|
| *H01H 47/00* | (2006.01) |
| *H02J 9/00* | (2006.01) |
| *H02M 1/12* | (2006.01) |
| *H02M 1/42* | (2007.01) |
| *H02M 7/06* | (2006.01) |
| *G06F 1/26* | (2006.01) |
| *H04N 5/63* | (2006.01) |
| *H02M 1/00* | (2006.01) |

(52) U.S. Cl.
CPC .............. *H01H 47/00* (2013.01); *G06F 1/26* (2013.01); *H02J 9/005* (2013.01); *H02M 1/126* (2013.01); *H02M 1/4208* (2013.01); *H02M 1/4225* (2013.01); *H02M 7/06* (2013.01); *H02M 2001/0032* (2013.01); *H04N 5/63* (2013.01); *Y02B 70/126* (2013.01); *Y02B 70/16* (2013.01)

(58) Field of Classification Search
CPC ........ H01H 47/00; H02J 9/005; H02M 1/126; H02M 1/4208; H02M 1/4225; H02M 7/06; H02M 2001/0032; H04N 5/63
USPC .......................................................... 307/64
See application file for complete search history.

(56) References Cited

U.S. PATENT DOCUMENTS

| | | |
|---|---|---|
| 7,940,540 B2 | 5/2011 | Vinciarelli et al. |
| 8,867,250 B2 | 10/2014 | Hua |
| 2008/0297462 A1 | 12/2008 | Hsiung et al. |
| 2013/0162053 A1* | 6/2013 | Iizuka .................... H01H 47/00 307/140 |

FOREIGN PATENT DOCUMENTS

| | | |
|---|---|---|
| JP | 2008109783 A | 5/2008 |
| JP | 2010145805 A | 7/2010 |
| KR | 10-1096131 | 12/2011 |

* cited by examiner

*Primary Examiner* — Carlos Amaya
(74) *Attorney, Agent, or Firm* — Staas & Halsey LLP

(57) ABSTRACT

A power supply apparatus is disclosed. The power supply apparatus to supply power to an electronic apparatus includes a first relay and a second relay which are turned on and off to control power supply with respect to the electronic apparatus, and a processor configured to control a switching operation of the first relay and the second relay based on at least one of a connection detection signal indicating connection of the power supply apparatus and the electronic apparatus, and a power on/off signal indicating a power on/off command with respect to the electronic apparatus.

17 Claims, 9 Drawing Sheets

POWER SUPPLY APPARATUS AND METHOD THEREOF

CROSS-REFERENCE TO RELATED APPLICATIONS

This application claims priority from Korean Patent Application No. 10-2016-0034138, filed on Mar. 22, 2016 in the Korean Intellectual Property Office, the disclosure of which is incorporated herein by reference in its entirety.

BACKGROUND

Field of the Invention

Apparatuses and method consistent with the present disclosure relate to a power supply apparatus and a method thereof, and more particularly, to an apparatus which supplies power to an electronic apparatus and a method thereof.

Description of the Related Art

Thanks to development of electronic technology, various types of electronic devices have been developed. In particular, electronic devices such as TV, PC, and laptop computer are wide-spread to the extent that they are used in most of households.

Recently, in order to improve productivity of an electronic device, efforts not only to upgrade performance of a device but also to improve design completeness of a device have been made. Here, in order to improve design completeness, making a size smaller is essential. TV, for example, can have a wider space, when thickness is thinner, and weight of a TV can be reduced. In addition, this TV can have a better appearance. Therefore, there are active studies to make thickness of a TV thinner.

An ordinary electronic device has a power supply unit to supply power to each component, and the power supply unit is composed of a larger circuit device (for example, transformer) and thus there is a limitation to make it small.

Accordingly, efforts have been made to reduce a size of an electronic apparatus by providing a power supply device which functions as a power board outside the electronic device.

However, such power supply device has drawbacks that energy efficiency is low and heat is generated due to power consumption of the power supply device.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a power supply apparatus which consumes less power and is safe, and a method of supplying power.

A power supply apparatus to supply power to an electronic apparatus according to an embodiment includes a first relay and a second relay which are turned on and off to control power supply with respect to the electronic apparatus; and a processor configured to control a switching operation of the first relay and the second relay based on at least one of a connection detection signal indicating connection of the power supply apparatus and the electronic apparatus, and a power on/off signal indicating a power on/off command with respect to the electronic apparatus.

In this case, the power supply apparatus may further include a line filter configured to remove noise with respect to power which is input from outside; a rectifier configured to rectify power which is output from the line filter; a standby power unit configured to provide standby power to turn on the electronic apparatus using power which is output from the line filter; and a power factor correction unit configured to correct power factor of power which is output from the rectifier and output the power to the electronic apparatus, wherein the first relay and the second relay may be respectively provided to a first power line and a second power line which connect the line filter and the rectifier.

The processor may control, in response to the connection detection signal indicating a connection state between the power supply apparatus and the electronic apparatus and the power on/off signal indicating a power on command of the electronic apparatus, the first relay and the second relay to turn on the first relay and the second relay.

The processor may control, in response to the connection detection signal indicating a connection state between the power supply apparatus and the electronic apparatus, one of the first relay and the second relay to turn on one of the first relay and the second relay.

The processor may control, in response to the power on/off signal indicating power on command with respect to the electronic apparatus, one of the first relay and the second relay so that a relay which is being turned off is turned on.

The power supply apparatus may further include a third relay to discharge electric charges accumulated in the power supply apparatus in a process of supplying the power to the electronic apparatus.

The processor may turn on and off the third relay based on at least one of the connection detection signal and the power on/off signal.

The processor, in response to the connection detection signal indicating a connection state of the power supply apparatus and the electronic apparatus and the power on/off signal indicating a power on command of the electronic apparatus, may control the first relay to the third relay so that the first relay and the second relay are turned on and the third relay is turned off.

The processor, in response to the connection detection signal indicating a connection state of the power supply apparatus and the electronic apparatus, may control at least one of the first relay and the second relay, and the third relay so that at least one of the first relay and the second relay is turned on and the third relay is turned off.

The electric charges supplied from the power may be accumulated in a condenser included in the power factor correction unit, and the processor may control the third relay so that the third relay, which is included in a discharging circuit connected to the condenser in parallel, is turned on, in order to discharge electric charges accumulated in the condenser.

A method for supplying power of a power supply apparatus which supplies power to an electronic apparatus according to an embodiment may include receiving a connection detection signal indicating connection of the power supply apparatus and the electronic apparatus and a power on/off signal indicating a power on/off command with respect to the electronic apparatus; and controlling a switching operation of the first relay and the second relay based on at least one of the received connection detection signal and the power on/off signal to control power supply with respect to the electronic apparatus.

The power supply apparatus may further include a line filter configured to remove noise of power which is input to the power supply apparatus; a rectifier configured to rectify power which is output from the line filter; a standby power unit configured to provide standby power to turn on the electronic apparatus using power which is output from the line filter; and a power factor correction unit configured to correct power factor of power which is output from the rectifier and output the power to the electronic apparatus, wherein the first relay and the second relay may be respectively provided to a first power line and a second power line which connect the line filter and the rectifier.

The controlling the first relay and the second relay may include, in response to the connection detection signal indicating a connection state between the power supply apparatus and the electronic apparatus and the power on/off signal indicating power on command of the electronic apparatus, controlling the first relay and the second relay to turn on the first relay and the second relay.

The controlling the first relay and the second relay may include, in response to the connection detection signal indicating a connection state between the power supply apparatus and the electronic apparatus, controls one of the first relay and the second relay to turn on one of the first relay and the second relay.

The controlling the first relay and the second relay may include, in response to the power on/off signal indicating a power on command of the electronic apparatus, controlling one of the first relay and the second relay to turn on a relay which is in a power off state.

The power supply apparatus may further include a third relay to discharge electric charges accumulated in the power supply apparatus in a process of supplying the power to the electronic apparatus.

The method may further include turning on and off the third relay based on at least one of the connection detection signal and the power on/off signal.

The turning on and off the third relay may include, in response to the connection detection signal indicating a connection state of the power supply apparatus and the electronic apparatus and the power on/off signal indicating a power on command of the electronic apparatus, controlling the first relay to the third relay so that the first relay and the second relay are turned on and the third relay is turned off.

The turning on and off the third relay may include, in response to the connection detection signal indicating a connection state of the power supply apparatus and the electronic apparatus, controlling at least one of the first relay and the second relay, and the third relay so that at least one of the first relay and the second relay is turned on and the third relay is turned off.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
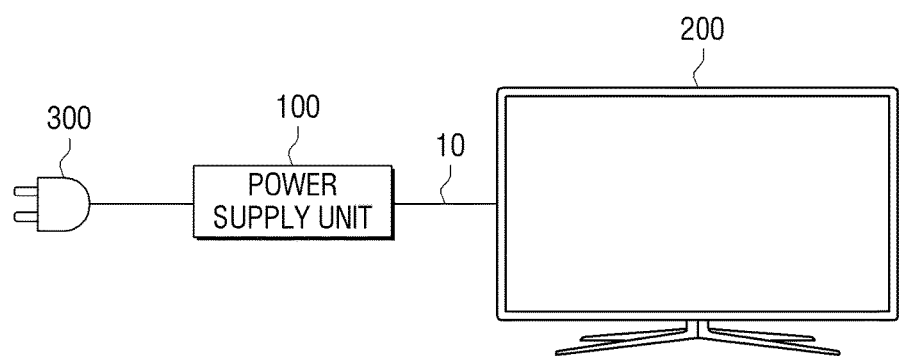
FIG. 1 is a diagram illustrating an example of power supply system, according to an embodiment of the present disclosure.

Certain exemplary embodiments of the present disclosure will now be described in greater detail with reference to the accompanying drawings. However, this is not intended to limit the present disclosure to particular modes of practice, and it is to be appreciated that all modifications, equivalents, and/or alternatives that do not depart from the spirit and technical scope of the present disclosure are encompassed in the present disclosure. Like reference numerals in the drawings denote like elements.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor.

Hereinafter, the present disclosure will be described in detail with reference to the accompanying drawings.

FIG. 1 is a diagram illustrating an example of power supply system, according to an embodiment of the present disclosure.

According to FIG. 1, the power supply system includes a power supply apparatus 100, an electronic apparatus 200 (hereinbelow, an example of a display apparatus 200 will be described by way of an example), and a power plug 300.

The power supply apparatus 100 supplies power to the display apparatus 200. To be specific, the power supply apparatus 100 receives power from the power plug 300 which is connected to power. Here, power is generally AC, but DC is also available. The power supply apparatus 100 removes noise of supplied AC power, rectifies AC power to DC power, improves power factor and provides it to the display apparatus 200. The power supply apparatus 100 will be described in greater detail with reference to FIGS. 2 and 3.

The electronic apparatus 200 performs various functions using DC power supplied from the power supply apparatus 100. Here, the electronic apparatus 200 may be embodied as various electronic apparatuses such as TV, PC, and laptop in addition to the aforementioned display apparatus 200.

The power plug 300 is connected to power. Here, the power plug 300 can be in contact with live (+ pole) and neutral (− pole) of a power socket, and when the socket provides grounding, it can be additionally connected to grounding.

In the meantime, the power supply apparatus 100 according to a present embodiment includes a relay, securing electrical safety, and includes minimum elements, providing high electronic efficiency. Various embodiments will be described in greater detail with reference to drawings below.

Figure 2:
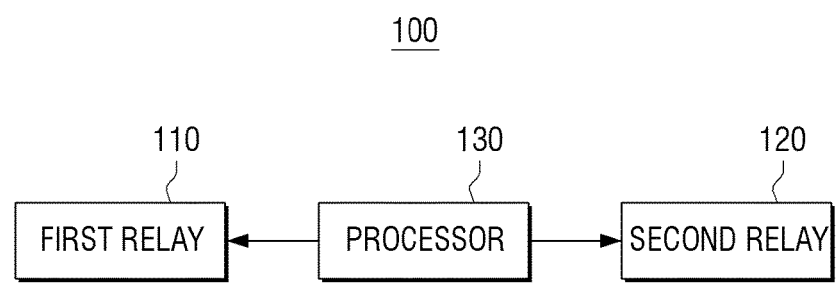
FIG. 2 is a block diagram illustrating a configuration of the power supply apparatus, according to an embodiment of the present disclosure.

FIG. 2 is a block diagram illustrating a configuration of the power supply apparatus, according to an embodiment of the present disclosure.

According to FIG. 2, the power supply apparatus 100 includes a first relay 110, a second relay 120, and a processor 130.

The first relay 110 and the second relay 120 are switched (turned on and off). Specifically, they are turned on and off to control supply of power with respect to the electronic apparatus 200. In this case, each of the first relay 110 and the second relay 120 is provided on each of circuit wire connected to live and neutral of power and may conduct power on and off switching operations. Here, the power-on operation of the first relay 110 and the second relay 120 is an operation to cut a circuit line (open) so that current may not flow.

The processor 130 controls a switching operation of the first relay 110 and the second relay 120. To be specific, the processor 130, based on a signal to control a switching operation of the first relay 110 and the second relay 120, controls a switching operation of the first relay 110 and the second relay 120.

Here, a signal to control a switching operation of the first relay 110 and the second relay 120 may be at least one of a connection detection signal indicating connection of the power supply apparatus 100 and the electronic apparatus 200, and a power on/off signal indicating a power on/off command with respect to the electronic apparatus 200.

For example, referring to FIG. 1, the power supply apparatus 100 and the electronic apparatus (display apparatus) 200 may be connected by the wire 10. Here, both ends of the wire 10 are formed in a type of a plug, and can be plugged in to each of the power supply apparatus 100 and the electronic apparatus 200. In this case, a state in which both ends of the wire 10 are connected to each of the power supply apparatus 100 and the electronic apparatus 200 can be defined as a state in which the power supply apparatus 100 and the electronic apparatus 200 are connected, and a state in which one of both ends of the wire 10 is not connected to at least one of the power supply apparatus 100 and the electronic apparatus 200 can be defined as a not-connected state. Accordingly, a connection detection signal may indicate one of a state in which the power supply apparatus 100 and the electronic apparatus 200 are connected and a state in which the power supply apparatus 100 and the electronic apparatus 200 are not connected.

In the meantime, a power on/off command with respect to the electronic apparatus 200 can be input from a user. Here, while the electronic apparatus 200 is turned off, when a power on command with respect to the electronic apparatus 200 is received, the power on/off command with respect to the electronic apparatus 200 is defined as a power on command with respect to the electronic apparatus 200. Also, while the electronic apparatus 200 is turned on, when a power off command with respect to the electronic apparatus 200 is received, the power on/off command with respect to the electronic apparatus 200 is defined as a power off command with respect to the electronic apparatus 200. In this case, while the electronic apparatus 200 is turned off, a power off command with respect to the electronic apparatus 200 is a power off command with respect to the electronic apparatus 200, and a power on command with respect to the electronic apparatus 200 while the electronic apparatus 200 is turned on is a power on command for the electronic apparatus 200.

The aforementioned the electronic apparatus 200 power on/off signal is normally based on a signal of a user received from the electronic apparatus 200, but it is also possible that a user signal is received from a signal receiver separately provided on the power supply apparatus 100 and render it as a power on off signal for the electronic apparatus 200.

In conclusion, the processor 130 may control a switching operation of the first relay 110 and the second relay 120 based on at least one of a connection detection signal indicating whether the power supply apparatus 100 and the electronic apparatus 200 are connected and a power on/off signal indicating a power on/off command with respect to the electronic apparatus 200.

By controlling the first relay 110 and the second relay 120 based on a signal to control a switching operation of the aforementioned first relay 110 and the second relay 120, whether to operate the power supply apparatus 100 can be controlled according to connection of the power supply apparatus 100 and the electronic apparatus 200, and power on/off of the electronic apparatus 200. Through this, when it is not necessary to supply power to the electronic apparatus 200 (when the power supply apparatus 100 and the electronic apparatus 200 are not connected or a power-off command of the electronic apparatus 200 is received), safety of electricity can be promoted by the power supply apparatus 100 by reducing lost energy through blocking current flowing inside and preventing electric shock (in consideration of the characteristic of boost circuit which is ordinarily used for power factor correction circuit, voltage which is rectified by the rectification circuit appears in the output terminal of the power factor correction circuit), and so on. Here, controlling of the first relay 110 and the second relay 120 respectively will be described later.

In the meantime, in the power factor correction (PFC) included in the power supply apparatus 100 which will be described later, electric charges are accumulated as the power supply apparatus 100 operates, and in order to remove risk of electric shock, when the power supply apparatus 100 is in an inactivated state (at least one of the first relay 110 and the second relay 120 is turned off), accumulated electric charges should be automatically discharged. In order to discharge the accumulated electric charges, the power supply apparatus 100 may further include discharge circuit.

For example, a discharge circuit may be a circuit in which one resistance and one relay are connected serially, but it is not limited thereto. The feature of the power supply apparatus 100 including a discharge circuit will be described with reference to FIG. 3.

Figure 3:
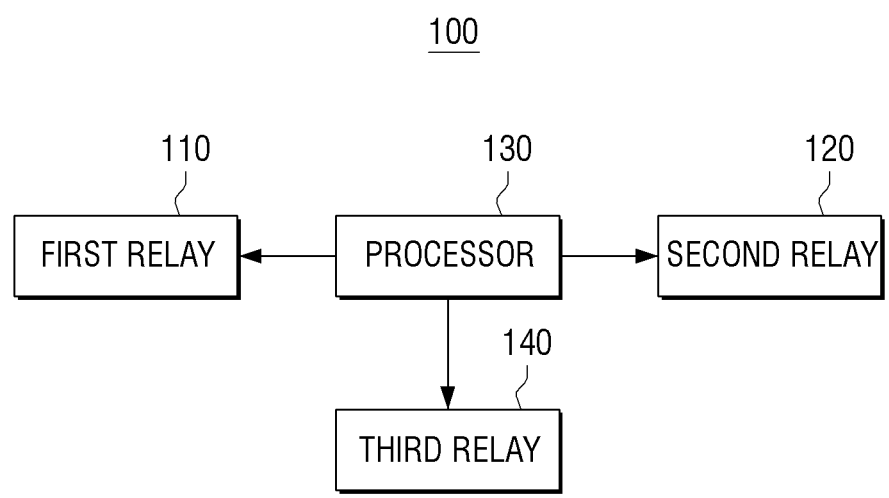
FIG. 3 is a block diagram illustrating a configuration of the power supply apparatus, according to another embodiment of the present disclosure.

FIG. 3 is a block diagram illustrating a configuration of the power supply apparatus, according to another embodiment of the present disclosure.

According to FIG. 3, the power supply apparatus 100 includes a first relay 110, a second relay 120, a processor 130, and a third relay 140. Here, the feature overlapped with the feature of FIG. 2 will not be further described.

A relay included in the aforementioned discharge circuit is defined as the third relay 140. That is, the third relay 140, through a switching operation, discharge electric charges accumulated in the power supply apparatus 100 in the process of supplying power to the electronic apparatus 200.

The processor 130 controls the third relay 140. To be specific, the processor 130 may turn on and off the third relay 140 based on at least one of the connection detection signal and the power on/off signal.

For example, it is assumed that electric charges supplied from power are accumulated in a condenser included in a power factor correction unit to be described later. When a signal to control a switching operation of the first relay 110 and the second relay 120, that is, a connection detection signal indicates a state where the power supply apparatus 100 and the electronic apparatus 200 are connected and a power on-off signal indicates a power-on command of the electronic apparatus 200, the processor 130 may determine that power should be supplied to the electronic apparatus 200, and by turning on the first relay 110 and the second relay 120, operate the power supply apparatus 100 and by turning off the third relay 140, turn off operation of the discharge circuit.

In contrast, when the connection detection signal indicates a state that the power supply apparatus 100 and the electronic apparatus 200 are not connected, or the power on/off signal indicates a power-off command of the electronic apparatus 200, the processor 130, in order to discharge electric charges accumulated in the condenser, controls the third relay 140 to power of the third relay 140 included in a discharge circuit which is connected to the condenser in a row.

In the aforementioned exemplary embodiment, it has been described that the first relay 110 and the second relay 120 and the third relay 140 carry out on/off operations at the same time, but the embodiment is not limited thereto and each of the first, second, and third relays 110, 120, and 140 can operate independently of each other. It is the same for the operations of the first, second, and third relays 110, 120, and 140 to be described later.

As described above, the processor 130 controls operations of the first, second, and third relays 110, 120, and 140 according to whether it is necessary to provide power to the electronic apparatus 200, and accordingly, current flow inside the power supply apparatus 100 is controlled. Through this, if it is not necessary to provide power with respect to the electronic apparatus 200, unnecessary power which is consumed in the power supply apparatus 100 can be decreased and electricity-related accidents such as electric shock can be prevented.

In the meantime, in order to check operations of each relay and current flow according thereto, detailed features of the power supply apparatus 100 will be described in a greater detail.

Figure 4:
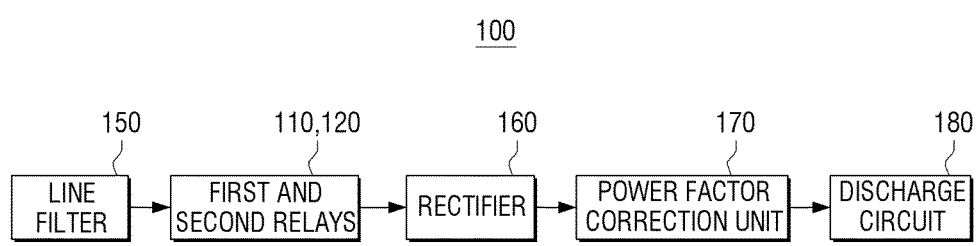
FIG. 4 is a block diagram illustrating a detailed configuration of the power supply apparatus, according to an embodiment of the present disclosure.

FIG. 4 is a block diagram illustrating a detailed configuration of the power supply apparatus, according to an embodiment of the present disclosure.

According to FIG. 4, the power supply apparatus 100 includes a line filter 150, the first relay 110, and the second relay 120, a rectifier 160, a power factor correction unit 170, and a discharge circuit 180. Here, the first relay 110 and the second relay 120 may be provided on each of the first and second power lines connecting the line filter 150 and the rectifier 160.

The line filter 150 removes noise of power which is input from outside.

The first relay 110 and the second relay 120 perform a role to provide power which is output from the line filter 150 through on/off operation to the rectifier 160.

The rectifier 160 performs rectification process with respect to power (AC) which is output from a line filter.

The power factor correction unit (PFC) 170 improves power factor of power which is rectified by the rectifier 160. That is, power factor of power which is output from the rectifier 160 is compensated and is output to the electronic apparatus 200. In general, power which is output from the rectifier 160 has reactive power and energy efficiency is deteriorated. The power factor correction unit 170 minimizes reactive power so that and adjusts power factor to be closer to 1. Output of the power factor correction unit 170 is provided as power of the electronic apparatus 200.

The discharge circuit 180 discharges electric charges accumulated on the power factor correction unit 170. The above is described with reference to FIG. 6.

Figure 5:
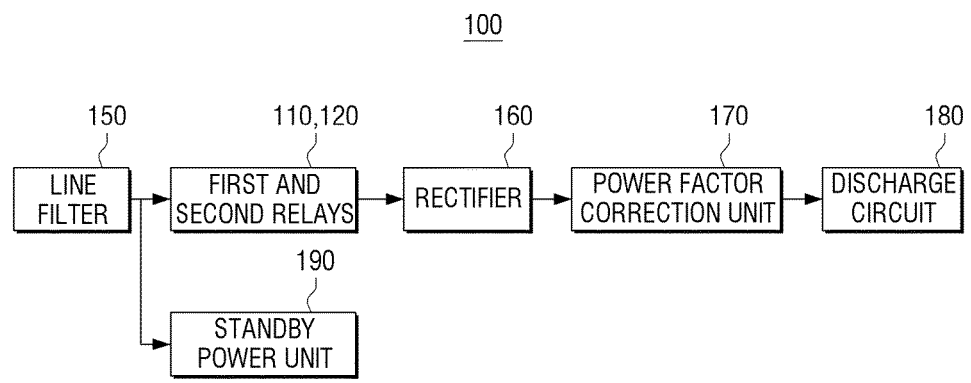
FIG. 5 is a block diagram illustrating a detailed configuration of the power supply apparatus, according to an embodiment of the present disclosure.

FIG. 5 is a block diagram illustrating a detailed configuration of the power supply apparatus, according to an embodiment of the present disclosure.

According to FIG. 5, the power supply apparatus 100 further includes a standby power unit 190. Here, the feature which is overlapped with the feature of FIG. 4 will not be further described.

The standby power unit 190 provides standby power for the electronic apparatus 200.

For example, the standby power unit 190, by using power which is output from the line filter 150, may provide standby power to turn on the electronic apparatus 200. To do this, the standby power unit 190 may include a rectification circuit and a DC/DC converter. Here, the rectification circuit has a role which is the same as that of the aforementioned the rectifier 160. The DC/DC converter outputs converted size of DC voltage. Through providing standby power by the standby power unit 190, the electronic apparatus 200 may receive a control signal from a control device such as a remote controller or perform various functions which are required while the electronic apparatus 200 is in a power-off state.

As such, the power supply apparatus 100 is composed of various elements, having a function to provide power to the electronic apparatus 200. The power supply apparatus 100 may include all the elements, or a part of the aforementioned elements by several combinations available. In addition, other than the aforementioned elements, for example, an element such as a DC/DC converter can be further included.

Hereinbelow, an example of embodying the power supply apparatus 100 will be described with reference to a circuit diagram. Here, the features overlapped with the aforementioned features will not be described.

Figure 6:
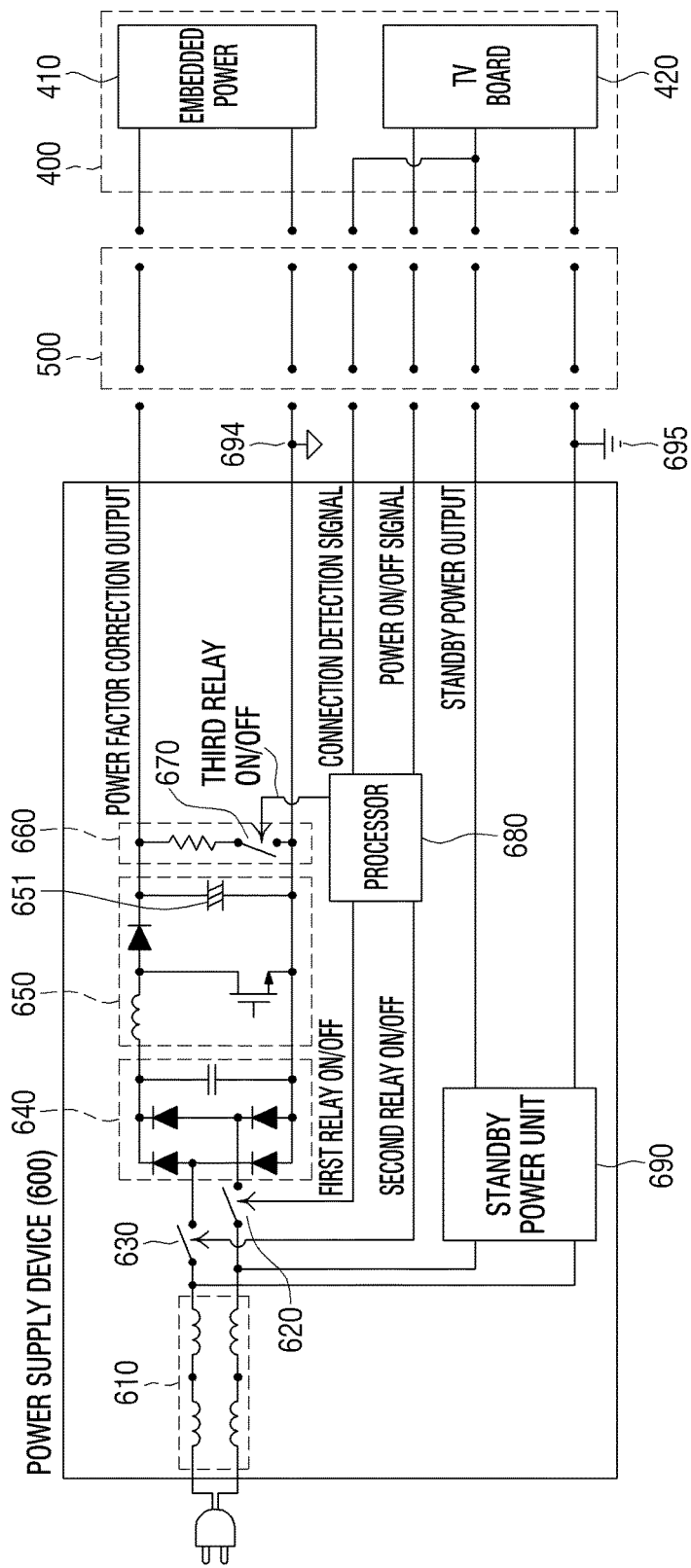
FIG. 6 is a circuit diagram the power supply apparatus, according to an embodiment of the present disclosure.

FIG. 6 is a circuit diagram the power supply apparatus, according to an embodiment of the present disclosure.

Referring to FIG. 6, a line filter 610 removes noise of power which is delivered from outside.

First and second relays 620, 630 flow current according to switching. Here, the first and second relays 620, 630 can be provided on a wire connecting an output terminal of the line filter 610 and an input terminal of the rectification unit 640.

When the first and second relays 620, 630 are turned on, power which is output from the line filter 610 is input to rectification circuit 640, and input power is input to the power factor correction unit 650 through rectification process. Here, electric charges are accumulated in a condenser 651 by power which is input to the power factor correction unit 650 and constant voltage is output to an output terminal (both ends of the condenser 651) of the power factor correction unit 650. The output terminal voltage of the power factor correction unit 650 is applied to embedded power 410 of embedded TV 400 through a cable 694. Here, one of the output terminals of the power factor correction unit 650 can be primarily grounded.

When at least one of the first and second relays 620, 630 is turned off, a circuit composing a power supply device 600 does not flow current by KVL and KCL. That is, the power supply device 600 is not operating.

In the meantime, at an output terminal of the power factor correction unit 650, a discharge circuit 660 may be provided. Here, the discharge circuit 660, when a third relay 670 is turned on, discharges electronic charges accumulated in the condenser 651, and when the third relay 670 is turned off, the discharge circuit 660 is turned off and current is not flown.

A processor 680 controls switching of first, second, and third relays 620, 630, and 670. In this case, the processor 680 may control the first, second, and third relays 620, 630, and 670 based on a connection detection signal and a power on/off signal.

To be specific, as for the connection detection signal, when a cable 500 is connected, output of standby power (for example, 5V) can be a connection detection signal. Alternatively, the connection detection signal may be a signal made by a TV board 420. When the connection detection signal is a signal which is made by the TV board 420, the signal, after the cable 500 is connected and the power supply device 600 becomes stable, may be provided to the processor 680. Through this, in an early unstable state where the cable 500 is connected, random switching of the first, second, and third relays 620, 630, and 670 can be prevented. An operation of the first, second, and third relays 620, 630, and 670 according to a control of the processor 680 will be described with reference to FIGS. 7 and 8.

The standby power unit 690 rectifies output of a line filter 610 and provides to a TV board 420 which controls the TV 400 in overall. Here, one of the output terminal of the standby power unit 690 can be grounded secondarily.

Figure 7:
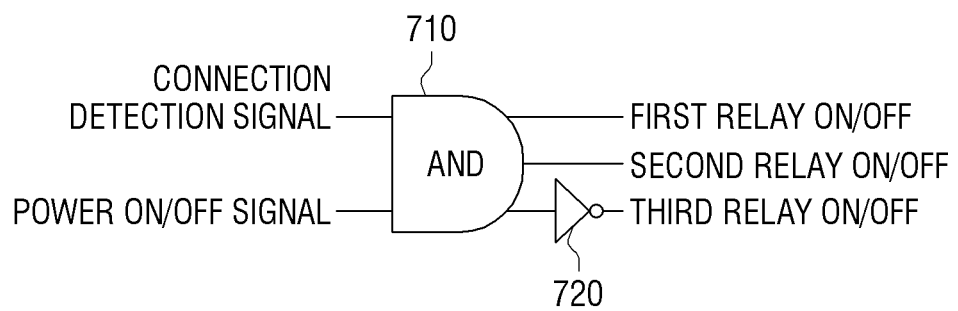
FIG. 7 is a diagram illustrating operations of the first, second, third relay, according to an embodiment of the present disclosure.

FIG. 7 is a diagram illustrating operations of the first, second, third relay, according to an embodiment of the present disclosure.

According to FIG. 7, the processor 680 may include an AND gate 710 and a NOT gate 720. The processor 680, by using a calculation result through the AND gate 710 and the NOT gate 720, may control the first, second, and third relays 620, 630, and 670.

For example, when a connection detection signal indicates a state that the power supply device 600 and the electronic device (e.g., TV 400) is connected (positive), and a power on/off signal indicates power on command of the electronic device 400 (positive), the AND gate 710 outputs a positive value. Accordingly, the first and second relays 620, 630 on/off signal have a positive value, and the third relay 670 on/off signal has a negative value as output of the AND gate 710 is reversed by the NOT gate 720.

In other words, the processor 680, when a connection detection signal indicates a state that the power supply device 600 and the electronic device (e.g., TV 400) is connected (positive), and a power on/off signal indicates power on command of the electronic device 400 (positive), controls the first and second relays 620, 630 to turn on first and second relays 620, 630.

Likewise, the processor 680, when a connection detection signal indicates a state that the power supply device 600 and the electronic device is connected, and a power on/off signal indicates power on command of the electronic device 400, controls the first, second, and third relays 620, 630, and 670 to turn on first and second relays 620, 630 and turn off the third relay 670.

Here, it is described that, according to the connection detection signal and the power on/off signal, on/off signal of the first, second, and third relays 620, 630, and 670 are changed simultaneously, but it is not limited thereto. An exemplary embodiment in which the first, second, and third relays 620, 630, and 670 on-off signals are changed simultaneously or with a time interval will be described with reference to FIG. 8.

Figure 8:
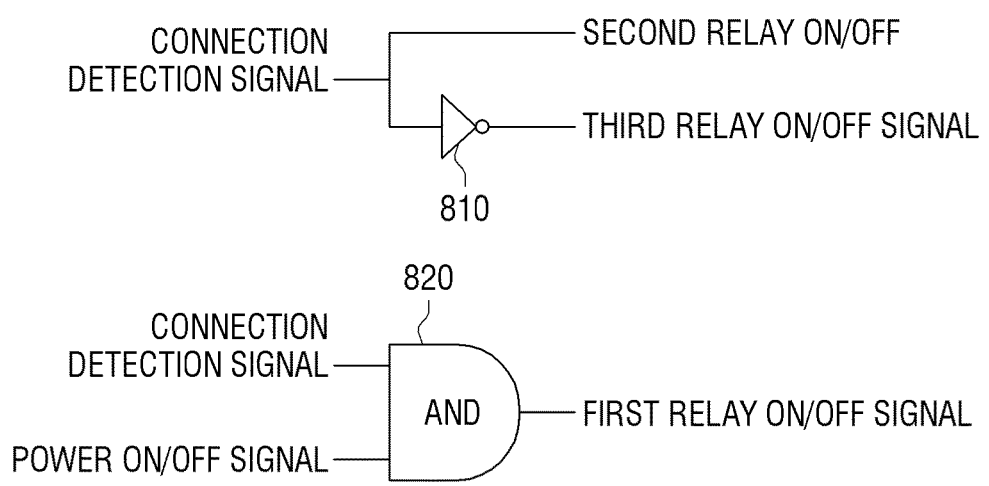
FIG. 8 is a diagram illustrating operations of the first, second, third relay, according to an embodiment of the present disclosure.

FIG. 8 is a diagram illustrating operations of the first, second, third relay, according to an embodiment of the present disclosure.

Referring to FIG. 8, the connection detection signal is output as an on/off signal of the second relay 630. In contrast, the third relay 670 on/off signal is a signal that the connection detection signal is reversed by the NOT gate 810.

For example, the processor 680, when the connection detection signal indicates a state that the power supply device 600 and the TV (electronic device) 400 are connected (positive), may control so that one of the first and second relays 620, 630 are turned on. In other words, in FIG. 8, when the power supply device 600 and the TV 400 are connected, the second relay 630 on/off signal becomes a positive value and the second relay 630 is turned on (short state), and the third relay 630 on/off signal becomes a negative value, and the third relay 670 becomes an off (open) state. In this case, the power on/off signal is negative, and the first relay 620 on/off signal is a negative value. Therefore, the first relay 620 is in a power-off (open state) state.

Likewise, the processor 680, when the connection detection signal indicates a state that the power supply device 600 and the electronic device 400 are connected, may control at least one of the first and second relays 620, 630 and so the third relay 670 so that at least one of the first and second relays 620, 630 is turned on and the third relay 670 is turned off.

Meanwhile, while the connection detection signal indicates a state that the power supply device 600 and the TV 400 are connected, when the power on/off signal indicates a power-on command of the TV (electronic device) 400, the processor 680 may control the first relay 620 so that the first relay 620 is turned on out of the first and second relays 620, 630.

As described in the above exemplary embodiment, when the connection detection signal and the power on/off signal are positive values, power is supplied from the power supply device 600. In the meantime, in case of at least one of the connection detection signal and the power on/off signal becomes a negative value (at least one of when connection of the cable 500 is released and a power-off command is received), at least one of the first and second relays 620, 630 can be turned off in contrary to the above example and power supply can be blocked. In this case, the third relay 670 is turned on, and electric charges accumulated in the condenser 651 of the power factor correction unit 650 can be discharged rapidly.

In the meantime, in the aforementioned example, it is described that the processor 680 is exclusively used for controlling switching of the first, second, and third relays 620, 630, and 670, but it is also possible that, by another processor for controlling the power supply device 600 in overall or an external processor outside the power supply device 600 (for example, a processor included in the TV 400), switching control of the first, second, and third relays 620, 630, and 670 can be performed.

In the meantime, the processor 680 may be configured using a separate IC for signal processing such as micro controller unit (MCU) and field programmable gate array (FPGA), or embodied by combination of digital components with analog components such as a transistor, diode, and resistance.

Figure 9:
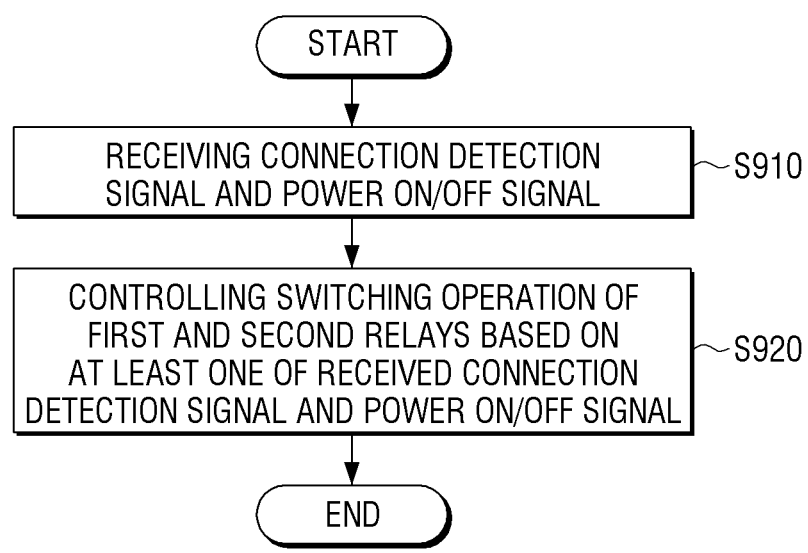
FIG. 9 is a flowchart illustrating a method for supplying power of the power supply apparatus, according to an exemplary embodiment.

FIG. 9 is a flowchart illustrating a method for supplying power of the power supply apparatus, according to an exemplary embodiment.

First of all, the connection detection signal indicating connection of the power supply apparatus 100 and the electronic apparatus 200 and power on/off signal indicating power on/off command for the electronic apparatus 200 are received (S910), and based on at least one of the received connection detection signal and power on/off signal, in order to control power supply with respect to the electronic apparatus 200, switching operation of the first relay 110 and the second relay 120 which is powered on and off is controlled.

In this case, the power supply apparatus 100 may further include the line filter 150 which removes noise of power which is input to the power supply apparatus 100, the rectifier 160 which rectifies power output from the line filter 150, a standby power unit 190 which provides standby power to turn on the electronic apparatus 200 using power which is output from the line filter 150, and the power factor correction unit 170 which corrects power factor of power which is output from the rectifier 160, and the first relay 110 and the second relay 120 may be provided on each of the first power line and the second power line connecting the line filter 150 and the rectifier 160.

Here, the step of controlling the first relay 110 and the second relay 120 indicates that, when the connection detection signal indicates a state of connection of the power supply apparatus 100 and the electronic apparatus 200, and when the power on-off signal indicates a power-on command of the electronic apparatus 200, may control the first relay 110 and the second relay 120 to turn on the first and second relays 110 and 120.

In addition, controlling the first relay 110 and the second relay 120, when the connection detection signal indicates a state that the power supply apparatus 100 and the electronic apparatus 200 are connected, may control one of the first relay 110 and the second relay 120 so that one of the first relay 110 and the second relay 120 can be turned on.

In addition, controlling the first relay 110 and the second relay 120, when the power on/off signal indicates a power-on command on the electronic apparatus 200, may control one of the first relay 110 and the second relay 120 so that relay which is being off out of the first relay 110 and the second relay 120 can be turned on.

In the meantime, the power supply apparatus 100, through switching operation, may further include the third relay 140 to discharge electric charges supplied and accumulated in the process of providing power to the electronic apparatus 200.

In this case, a method of supplying power may further include turning on/off the third relay 140 based on at least one of connection detection signal and the power on/off signal.

Here, turning on/off the third relay 140, when the connection detection signal indicates a state that the power supply apparatus 100 and the electronic apparatus 200 are connected and the power on/off signal indicates a power-on command of the electronic apparatus 200, may control the first to third relays 110 and 120 so that the first relay 110 and the second relay 120 are turned on and the third relay 140 is turned off.

In addition, the turning on/off the third relay 140, when the connection detection signal indicates a state of connecting the power supply apparatus 100 and the electronic apparatus 200, may control at least one of the first relay 110 and the second relay 120 and the third relay 140 so that at least one of the first relay 110 and the second relay 120 is turned on and the third relay 140 is turned off.

In the meantime, a method of supplying power of the power supply apparatus 100 according to various exemplary embodiments can be embodied as a program code executable by the computer and provided to each server or device so that it is executed as being stored in various non-transitory computer readable medium.

For example, a non-transitory computer readable medium where a program performing receiving the connection detection signal indicating connection of the power supply apparatus 100 and the electronic apparatus 200, and the power on/off signal indicating a power on/off command with respect to the electronic apparatus 200, and controlling a switching operation of the first relay 110 and the second relay 120 which is powered on and off to control power supply with respect to the electronic apparatus 200 based on at least one of the received connection detection signal and power on/off signal stored therein can be provided.

The non-transitory computer-recordable medium is not a medium configured to temporarily store data such as a register, a cache, or a memory, but an apparatus-readable medium configured to semi-permanently store data. Specifically, the above-described various applications or programs may be stored in a non-transitory apparatus-readable medium such as a compact disc (CD), a digital versatile disc (DVD), a hard disc, a Blu-ray disc, a universal serial bus (USB), a memory card, or a read only memory (ROM), and then may be provided to a user terminal device.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A power supply apparatus to supply power to an electronic apparatus, the power supply apparatus comprising:
 a first relay and a second relay to be turned on and off to control the supply of the power for the electronic apparatus; and
 a processor to control a switching operation of the first relay and/or the second relay based on:

a connection detection signal indicating a connection state between the power supply apparatus and the electronic apparatus, and a power on/off signal indicating one of a power on command and a power off command with respect to the electronic apparatus, wherein, in response to the connection detection signal indicating the connection state of the power supply apparatus being connected to the electronic apparatus and the power on/off signal indicating the power off command with respect to the electronic apparatus, the processor controls one of the first relay and the second relay to turn on one of the first relay and the second relay.

2. The power supply apparatus as claimed in claim 1, further comprising:

a line filter to remove noise from power supplied from outside and output the supplied power to the first relay through a first power line, the second relay through a second power line and a standby power unit;

a rectifier connected to the first relay through the first power line and the second relay through the second power line to rectify the supplied power output from the line filter through the first relay and the second relay;

the standby power unit to provide standby power to turn on the electronic apparatus using the supplied power from the line filter; and a power factor correction unit configured to correct a power factor of the rectified power rectified by the rectifier and output the corrected power to the electronic apparatus, wherein the first relay and the second relay are respectively provided to the first power line and the second power line connecting the line filter and the rectifier.

3. The power supply apparatus as claimed in claim 1, wherein:

in response to the connection detection signal indicating the connection state of the power supply apparatus being connected to the electronic apparatus and the power on/off signal indicating the power on command of the electronic apparatus, the processor controls the first relay and the second relay to turn on the first relay and the second relay.

4. The power supply apparatus as claimed in claim 1, wherein, in response to the power on/off signal indicating the power on command with respect to the electronic apparatus, the processor controls one of the first relay and the second relay to be turned on from being turned off.

5. The power supply apparatus as claimed in claim 2, further comprising:

a third relay to discharge electric charges accumulated in the power supply apparatus while in a process of supplying the power to the electronic apparatus.

6. The power supply apparatus as claimed in claim 5, wherein the processor turns on and off the third relay based on at least one of the connection detection signal and/or the power on/off signal.

7. The power supply apparatus as claimed in claim 6, wherein, in response to the connection detection signal indicating the connection state of the power supply apparatus being connected to the electronic apparatus and the power on/off signal indicating the power on command of the electronic apparatus, the processor controls the first relay to the third relay so that the first relay and the second relay are turned on and the third relay is turned off.

8. The power supply apparatus as claimed in claim 6, wherein, in response to the connection detection signal indicating the connection state of the power supply apparatus being connected to the electronic apparatus, the processor controls at least one of the first relay and/or the second relay and controls the third relay, so that at least one of the first relay and the second relay is turned on and the third relay is turned off.

9. The power supply apparatus as claimed in claim 5, wherein:

the electric charges are supplied from the power and are to be accumulated in a condenser included in the power factor correction unit, the third relay is included in a discharging circuit connected in parallel to the condenser, and the processor controls the third relay to be turned on, to discharge electric charges accumulated in the condenser.

10. A method for supplying power of a power supply apparatus using a first relay and a second relay, which supplies power to an electronic apparatus, the method comprising:

receiving:

a connection detection signal indicating a connection state between the power supply apparatus and the electronic apparatus, and a power on/off signal indicating one of a power on command and a power off command with respect to the electronic apparatus; and controlling a switching operation of the first relay and the second relay based on the received connection detection signal and the power on/off signal to control power supply with respect to the electronic apparatus, wherein the controlling the first relay and the second relay comprises:

in response to the connection detection signal indicating the connection state of the power supply apparatus being connected to the electronic apparatus and the power on/off signal indicating the power off command of the electronic apparatus, controlling one of the first relay and the second relay to turn on one of the first relay and the second relay.

11. The method as claimed in claim 10, wherein the power supply apparatus further comprises:

a line filter to remove noise from power to be input to the power supply apparatus and output filtered power;

a rectifier configured to rectify the filtered power from the line filter and output rectified power;

a standby power unit to provide standby power to turn on the electronic apparatus using the filtered power from the line filter; and a power factor correction unit configured to correct power factor of the rectified power rectified by the rectifier and output the corrected power to the electronic apparatus, wherein the first relay and the second relay are respectively provided to the first power line and the second power line connecting the line filter and the rectifier.

12. The method as claimed in claim 10, wherein the controlling the first relay and the second relay comprises:

in response to the connection detection signal indicating the connection state of the power supply apparatus being connected to the electronic apparatus and the power on/off signal indicating the power on command of the electronic apparatus, controlling the first relay and the second relay to turn on the first relay and the second relay.

13. The method as claimed in claim 10, wherein the controlling the first relay and the second relay comprises:
in response to the power on/off signal indicating the power on command of the electronic apparatus, controlling one of the first relay and the second relay to turn on a relay when the one of the first relay and the second relay is in a power off state.

14. The method as claimed in claim 11, wherein the power supply apparatus further comprises:
a third relay to discharge electric charges accumulated in the power supply apparatus while in a process of supplying the power to the electronic apparatus.

15. The method as claimed in claim 14, further comprising:
turning on and off the third relay based on at least one of the connection detection signal and/or the power on/off signal.

16. The method as claimed in claim 15, wherein the turning on and off the third relay comprises:
in response to the connection detection signal indicating the connection state of the power supply apparatus being connected to the electronic apparatus and the power on/off signal indicating a power on command of the electronic apparatus, controlling the first relay to the third relay so that the first relay and the second relay are turned on and the third relay is turned off.

17. The method as claimed in claim 15, wherein the turning on and off the third relay comprises:
in response to the connection detection signal indicating the connection state of the power supply apparatus being connected to the electronic apparatus, controlling at least one of the first relay and/or the second relay, and controlling the third relay, so that at least one of the first relay and the second relay is turned on and the third relay is turned off.

\* \* \* \* \*